United States Patent
Iijima

(10) Patent No.: US 9,061,727 B2
(45) Date of Patent: Jun. 23, 2015

(54) FRAME STRUCTURE FOR A SADDLE-RIDE TYPE VEHICLE, AND VEHICLE INCORPORATING THE SAME

(75) Inventor: Shigeo Iijima, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 454 days.

(21) Appl. No.: 13/332,947

(22) Filed: Dec. 21, 2011

(65) Prior Publication Data

US 2012/0161419 A1 Jun. 28, 2012

(30) Foreign Application Priority Data

Dec. 27, 2010 (JP) ................. 2010-290168

(51) Int. Cl.
*B62K 11/04* (2006.01)
*B62K 19/18* (2006.01)
*B62K 19/28* (2006.01)

(52) U.S. Cl.
CPC ................. *B62K 11/04* (2013.01); *B62K 19/18* (2013.01); *B62K 19/28* (2013.01)

(58) Field of Classification Search
CPC ........ B62K 19/16; B62K 19/18; B62K 19/20; B62K 19/28; B62K 11/02; B62K 11/04
USPC ...................... 280/281.1, 304.3; 180/219, 311
See application file for complete search history.

(56) References Cited

U.S. PATENT DOCUMENTS

| | | | | |
|---|---|---|---|---|
| 583,022 A * | 5/1897 | Bolte | | 280/279 |
| 2,245,751 A * | 6/1941 | Blackmore | | 411/201 |
| 2,575,292 A * | 11/1951 | Persons | | 280/304.3 |
| 3,477,741 A * | 11/1969 | Ross | | 280/279 |
| 3,889,975 A * | 6/1975 | Falconi | | 280/281.1 |
| 4,019,595 A * | 4/1977 | Imai et al. | | 180/229 |
| 4,694,929 A * | 9/1987 | Sugimoto | | 180/311 |
| 4,712,637 A * | 12/1987 | Mogi et al. | | 180/219 |
| 6,073,948 A * | 6/2000 | Motojima et al. | | 280/152.2 |
| 6,102,149 A * | 8/2000 | Suzuki et al. | | 180/229 |
| 6,782,981 B2 * | 8/2004 | Larmande | | 188/379 |
| 7,073,617 B2 * | 7/2006 | Miyashiro et al. | | 180/219 |
| 7,503,415 B2 * | 3/2009 | Hasegawa et al. | | 180/228 |
| 2003/0066697 A1 * | 4/2003 | Kodan et al. | | 180/68.4 |
| 2004/0007409 A1 * | 1/2004 | Keller et al. | | 180/228 |
| 2004/0124032 A1 * | 7/2004 | Iizuka et al. | | 180/311 |
| 2005/0006163 A1 * | 1/2005 | Brendelson et al. | | 180/227 |
| 2006/0065454 A1 * | 3/2006 | Oshima et al. | | 180/68.4 |
| 2007/0023216 A1 * | 2/2007 | Isayama | | 180/219 |

(Continued)

FOREIGN PATENT DOCUMENTS

| | | |
|---|---|---|
| CN | 201201686 Y | 3/2009 |
| JP | S59-220473 A | 12/1984 |

*Primary Examiner* — Joseph Rocca
*Assistant Examiner* — Maurice Williams
(74) *Attorney, Agent, or Firm* — Carrier Blackman & Associates, P.C.; Joseph P. Carrier; Jeffrey T. Gedeon

(57) ABSTRACT

In a motorcycle having a head pipe, and a pair of left and right frame sections including left and right down tubes extended rearward from the head pipe, a cross plate continuously connects the pair of left and right down tubes in a width direction of the motorcycle. The cross plate is elastically connected to the left and right down tubes. Such arrangement of the cross plate suppresses distortion of a pair of left and right frame sections including the down tubes extended so as to be connected by the head pipe, and also improves the controllability and straight traveling characteristic of the motorcycle.

10 Claims, 6 Drawing Sheets

(56) References Cited

U.S. PATENT DOCUMENTS

2008/0223648 A1* 9/2008 Shiraishi ................ 180/312
2009/0243374 A1* 10/2009 Tahara et al. ................ 303/3
2009/0266944 A1* 10/2009 Mominee et al. ........... 248/67.7
2010/0012415 A1* 1/2010 Hedtke ..................... 180/219
2010/0187033 A1* 7/2010 Hayashi et al. ............ 180/68.4
2010/0320723 A1* 12/2010 Kashiwai et al. ............ 280/283
2011/0073398 A1* 3/2011 Yokoyama et al. ........... 180/219
2011/0127098 A1* 6/2011 Tsutsui et al. ................ 180/219
2012/0200062 A1* 8/2012 O'Conner .................... 280/284

* cited by examiner

FRAME STRUCTURE FOR A SADDLE-RIDE TYPE VEHICLE, AND VEHICLE INCORPORATING THE SAME

CROSS-REFERENCE TO RELATED APPLICATIONS

The present invention claims priority under 35 USC 119 based on Japanese patent application No. 2010-290168, filed on Dec. 27, 2010. The entire subject matter of this priority document, including specification claims and drawings thereof, is incorporated by reference herein.

BACKGROUND OF THE INVENTION

1. Field of the Invention

The present invention relates to a frame structure for a saddle-ride type vehicle. More particularly, the present invention relates to a frame structure for a saddle-ride type vehicle, in which at least some components of the frame structure are elastically connected, and to a vehicle incorporating the same.

2. Description of the Background Art

There is a known motorcycle adopting a so-called double-cradle type frame structure which joins a pair of left and right down frame sections extending downward in the rear direction to a head pipe. In such a body frame structure, pipe material is generally used for the down frame. When a double-cradle type motorcycle is relatively large with a distance between an engine and the head pipe and with a limited thickness of the pipe from the standpoint of appearance, the distortion of the down frame sometimes becomes larger. Therefore, in case of relatively large motorcycles, as in the Japanese Unexamined Patent Publication No. S59-220473, it is sometimes necessary to make a cross frame into a single rigid body by continuously connecting down frame sections (down pipes) with the cross frame (cross pipe) by welding and the like.

In a saddle-ride type vehicle such as a motorcycle and the like, as described above, distortion of a frame can be suppressed by continuously connecting the frame sections with a cross frame. However, there is a possibility to improve the controllability and straight traveling characteristic of the motorcycle by a driver according to the frame configuration, the position of a frame provided with a cross frame in the entire vehicle and the mounting position of the engine which contributes to the rigidity thereof.

The present invention has been achieved in consideration of the above-described circumstances. Accordingly, it is one of the objects of the present invention to provide a saddle-ride type vehicle including a frame structure which can suppress the distortion of a pair of left and right frame sections extending so as to be connected by a head pipe, and to improve the controllability and straight traveling characteristic of the vehicle.

SUMMARY OF THE INVENTION

In order to achieve the above objects, the present invention according to a first aspect thereof provides a saddle-ride type vehicle having a head pipe (12) and a pair of left and right frame sections (27, 27) extending rearward from the head pipe (12), wherein a cross plate (60) continuously connects the pair of left and right frame sections (27, 27) in the width direction of the vehicle, and the cross plate (60) is elastically connected to the frame sections (27, 27).

The present invention according a second aspect thereof provides a saddle-ride type vehicle including the head pipe (12), the pair of left and right frame sections (27, 27) extended rearward from the head pipe (12), wherein the cross plate (60) connects the pair of left and right frame sections (27, 27) in the width direction of the vehicle, the cross plate (60) extends inward in the width direction of the vehicle from the pair of left and right frame sections (27, 27) respectively, and the cross plate is elastically connected to the pair of left and right frame sections (27, 27).

The present invention according to a third aspect thereof, in addition to the first aspect, is characterized in that the pair of left and right frame sections (27, 27) are provided integrally with a pair of left and right stays (80, 81) extending inward in the width direction of the vehicle respectively; the cross plate (82) is provided between the pair of left and right stays (80, 81); and at least one of the pair of left and right stays (80, 81) is elastically connected to the cross plate (82).

The present invention according to a fourth aspect thereof, in addition to the second aspect, is characterized in that the cross plate includes a first cross plate (first plate half) (61) and a second cross plate (second plate half) (62) having a hole (63) formed in one of the first and second cross plates (61, 62) extending inward in the width direction of the vehicle from the pair of left and right frame sections (27, 27) respectively; an elastic member (65) is fitted in the hole (63); the elastic member (65) having a through hole (64) formed therein; a tubular collar (68) is inserted into the through hole (64); and the cross plate (60) is elastically connected to the frame sections (27, 27) such that one cross plate (61) is fastened to the other cross plate (62) via the hole (63), and the through hole (64) of the elastic member (65) and a fastening member (69) penetrate the collar (68).

The present invention according to a fifth aspect thereof, in addition to the third aspect, is characterized in that a hole (85) is formed in the cross plate (82); an elastic member (65) is fitted in the hole (85); the elastic member (65) has a through hole (64) formed therein; a tubular collar (68) is inserted into the through hole (64); and the cross plate (82) is elastically connected to the frame sections (27, 27) such that the cross plate (82) is fastened to at least one of a pair of left and right stays (80, 81) via the hole (85), the through hole (64) of the elastic member (65) and the fastening member (69) penetrating the collar (68).

The present invention according to a sixth aspect thereof, in addition to one of the first through fifth aspects, is characterized in that the frame sections (27, 27) are the down tubes extended downward from the head pipe (12).

EFFECTS OF THE INVENTION

According to each of the first and second aspects of the present invention, the pair of left and right frame sections are continuously connected so as to be elastically connected by the cross plate such that the cross plate is connected to the frame sections. Consequently, the frame sections are allowed to be moderately distorted, which thereby can suppress the excessive distortion of the frame sections. Additionally, steering effort is moderately increased, which can improve the controllability and straight traveling characteristic of the vehicle.

Particularly, according to the second aspect of the present invention, the left and right frame sections can be continuously connected just by elastically connecting the inside portions of the cross plate in the width direction of the vehicle with each other, which extend inward in the width direction of the vehicle from the left and right frame sections, which thereby can reduce the number of parts and also can fine-tune just by changing the elastic member.

In addition, according to the third aspect of the present invention, by using the cross plate, a component separate from the left and right frame sections, it is possible to increase the degree of freedom and effectiveness in the assembly work.

Furthermore, according to the fourth and fifth aspect of the present invention, the elastic member can be provided in the cross plate in advance, which thereby can improve the assembly.

According to the sixth aspect of the present invention, by providing the cross plate between the down tubes which tend to be relatively distorted, it is possible to moderately increase the steering effort and to improve the controllability and straight traveling characteristic of the vehicle effectively.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
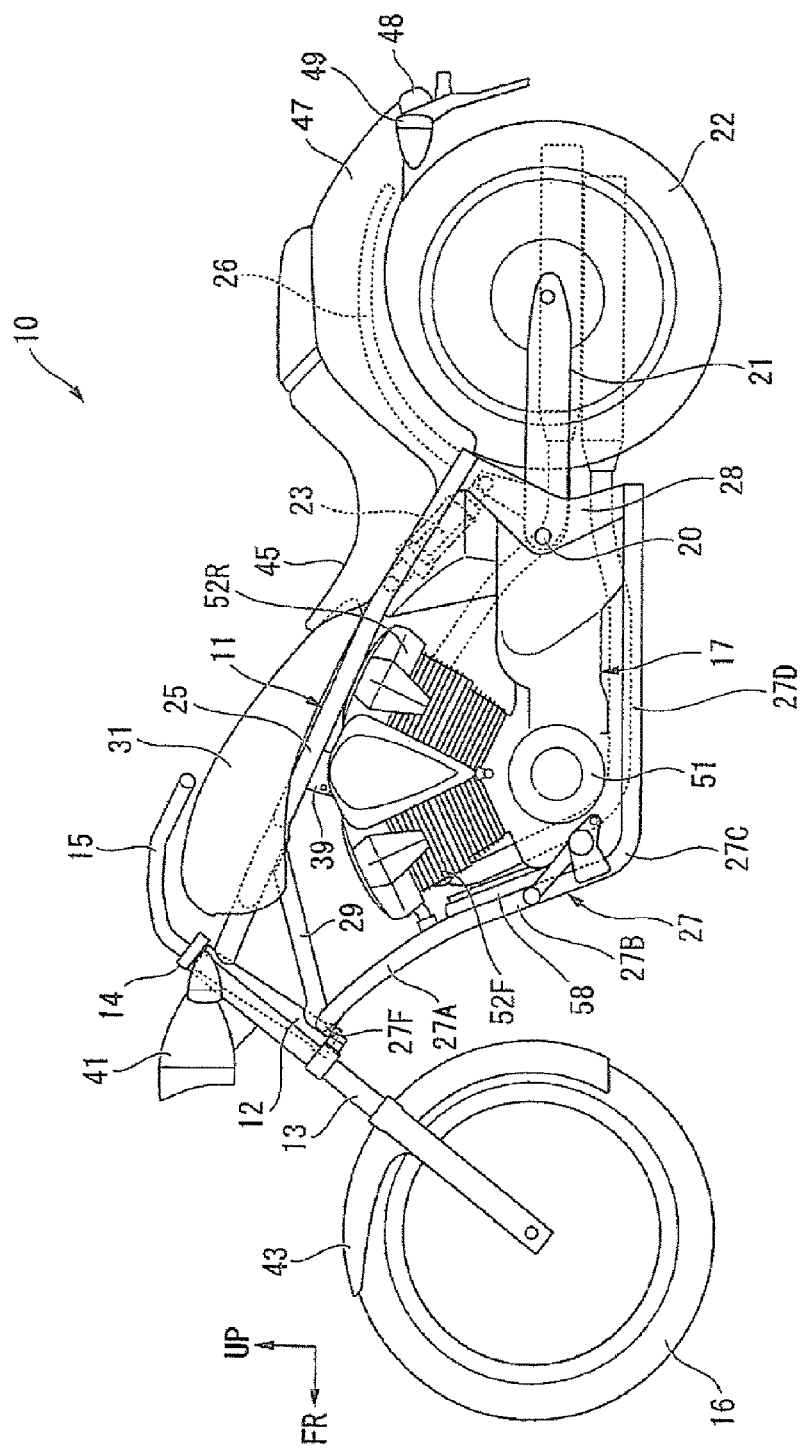
FIG. 1 is a left side view of a motorcycle according to an illustrative embodiment of the present invention.

Illustrative embodiments of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, in the drawings described below, an arrow FR shows the front, an arrow UP shows the upper, and an arrow LH shows the left of the vehicle body.

A motorcycle 10 shown in FIG. 1 is a cruiser type, saddle-ride type motorcycle. The motorcycle 10 includes a body frame 11; a pair of left right front forks 13 rotatably supported on the head pipe 12 which is mounted on the front end portion of the body frame 11; a steering handle 15 mounted on a top bridge 14 which supports the upper end portion of the front forks 13; a front wheel 16 rotatably supported by the front forks 13; an engine 17 (power unit) supported by the body frame 11; a rear swing arm 21 vertically swingably supported by a pivot 20 of the rear lower portion of the body frame 11; a rear wheel (driving wheel) 22 rotatably supported on the rear end portion of the rear swing arm 21; and a rear shock absorber 23 inserted between the rear swing arm 21 and the body frame 11.

In the illustrative embodiment of the present invention, the steering system essentially includes components such as the front forks 13, the top bridge 14, the handle 15, the front wheel 16 and the like.

Figure 2:
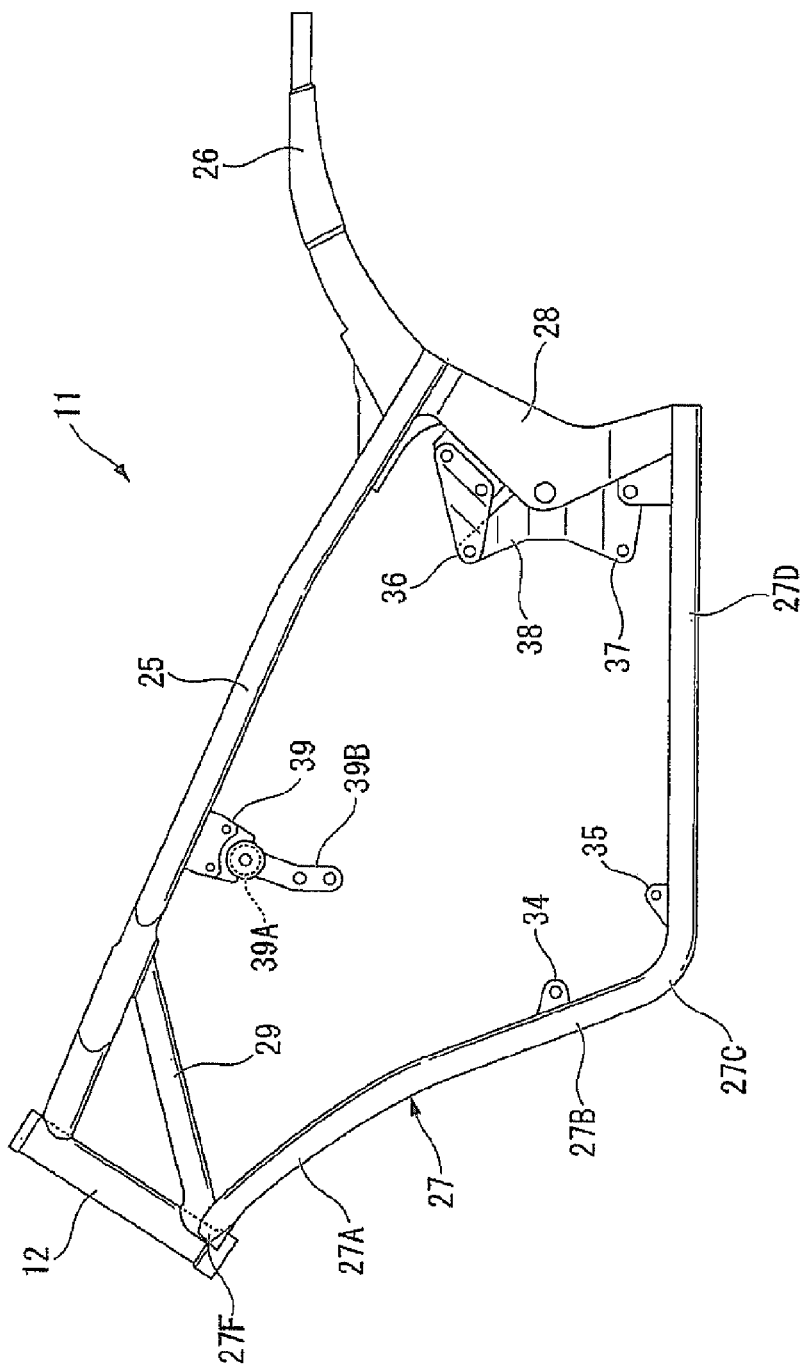
FIG. 2 is a left side view of a body frame of the motorcycle.

Referring also to FIG. 2, the body frame 11 includes a pair of left and right steel tubular main tubes 25, 25 extending downwardly toward the rear from the head pipe 12; a steel tubular rear frame 26 extending rearward from the rear end portion of the main tube 25; a pair of left and right frame sections including left and right steel tubular down tubes 27, 27 which bend after extending downward in the rear direction from the head pipe 12 below the main tubes 25, 25 and extend rearward substantially in the horizontal direction; and a pair of left and right pivot plates 28, 28 which continuously connect the rear end of a pair of left and right down tubes 27, 27 and the rear end of the main tubes 25, 25.

In the motorcycle 10, the pair of left and right main tubes 25, 25 is symmetrically formed with respect to the surface extending in the front-rear direction of the vehicle body along the center in the width direction of the vehicle (hereinafter referred to as a middle surface of the vehicle body), and is formed in a linear frame extending downwardly toward the rear from the head pipe 12 substantially in a straight line. A fuel tank 31 is mounted on the main tube 25 so as to straddle from the above, is disposed closer to the head pipe 12 and is formed in a tank shape extending longitudinally substantially perpendicular to the main tubes 25, 25.

A pair of left and right down tubes 27, 27 is symmetrically formed with respect to the center in the width direction of the vehicle, and the upper portion thereof are formed in a curved frame.

Specifically, the pair of left and right down tubes 27, 27 is integrally provided with curved portions 27A, 27A curving downwardly toward the rear from the head pipe 12; straight inclined portions (straight portions) 27B, 27B extending downwardly toward the rear in a straight line from the lower end of the curved portions 27A, 27A; bending portions 27C, 27C bending from the lower end of the straight inclined portions 27B, 27B in the rearward direction; and horizontal portions 27D, 27D extending substantially horizontally in a straight line from the rear end of the bending portions 27C, 27C in the rearward direction.

In other words, the upper portions of down tubes 27, 27 are the curved portions 27A, 27A curving in a side view, and the lower portions of the down tubes 27, 27 are the straight inclined portions 27B, 27B extending in a straight line from the curved portions 27A, 27A in a side view.

The front ends of a pair of left and right down tubes 27, 27 join so as to be jointed with each other, and are continuously connected to the head pipe 12 via joining portions 27F, 27F. A pair of left and right gusset pipes 29 for reinforcement extends rearward from the joining portions 27F, 27F, and is continuously connected to the main tubes 25, 25. By such constitution, the frame rigidity of the front portion of the body frame 11 is fully secured.

A head light 41 is provided on the front portion of the head pipe 12, and a front fender 43, which covers the area from the upper to the rear of the front wheel 16, is mounted on a pair of left and right front forks 13. In addition, a seat 45 on which a passenger sits is supported in the rear of the fuel tank 31. The seat 45 is supported by the rear portion of the main tubes 25, 25 and the rear frame 26. A rear fender 47 covering the upper of the rear wheel 22 is supported below the rear of the seat 45.

Lights such as a tail light 48 and a blinker 49 and the like are supported on the rear portion of the rear fender 47.

The engine 17 is supported in the space surrounded by the main tubes 25, 25, the down tubes 27, 27 and the pivot plates 28, 28. The engine 17 is a water-cooled four-cycle, longitudinal V-type two-cylinder engine including a crankcase 51 and two cylinder portions 52F, 52R which are vertically arranged with a predetermined nipping angle from the crankcase 51 in the front-rear direction of the vehicle body. The power of the engine 17 is transmitted to the rear wheel 22 via a drive shaft disposed within the rear swing arm 21 and passes by the side (the left side in the embodiment) of the rear wheel 22.

The front portion of the engine 17 is not disposed between a pair of left and right down tubes 27, 27, but is disposed so as to be slightly spaced apart behind the down tubes 27, 27. Therefore, the entire engine 17 can be visible from the side.

The mounting portion of the engine 17 on the body frame 11 will now be described.

As shown in FIG. 2, a pair of left and right front-upper engine hangers 34, 34 protruding rearward are provided on the straight inclined portions 27B, 27B of the down tubes 27, 27, and a pair of left and right front-lower engine hangers 35, 35 protruding upward are provided on the front portion of the horizontal portions 27D, 27D of the down tubes 27, 27. The front portion of the crankcase 51 is supported by the front-upper engine hangers 34, 34 and the front-lower engine hangers 35, 35.

Additionally, a pair of left and right rearside engine hangers 38, 38 so as to protrude forward are provided on the pivot plates 28, 28. The pivot plates 28, 28 have upperside fixing portions 36, 36 and lowerside fixing portions 37, 37 vertically aligned. The rear portion of the crankcase 51 is supported by the rearside engine hangers 38, 38. Further, an upper engine hanger 39 protruding downward is provided at substantially-central area in the front-rear direction of the main tube 25 on one side. The upper engine hanger 39 has a tubular portion at the lower portion thereof. An elastic member 39A is inserted of the tubular portion of the engine hanger 39. A bracket body 39B is hung via the elastic member 39A. The bracket body 39B elastically supports the upper portion of the engine 17 between the cylinder portions 52F, 52R.

Figure 3:
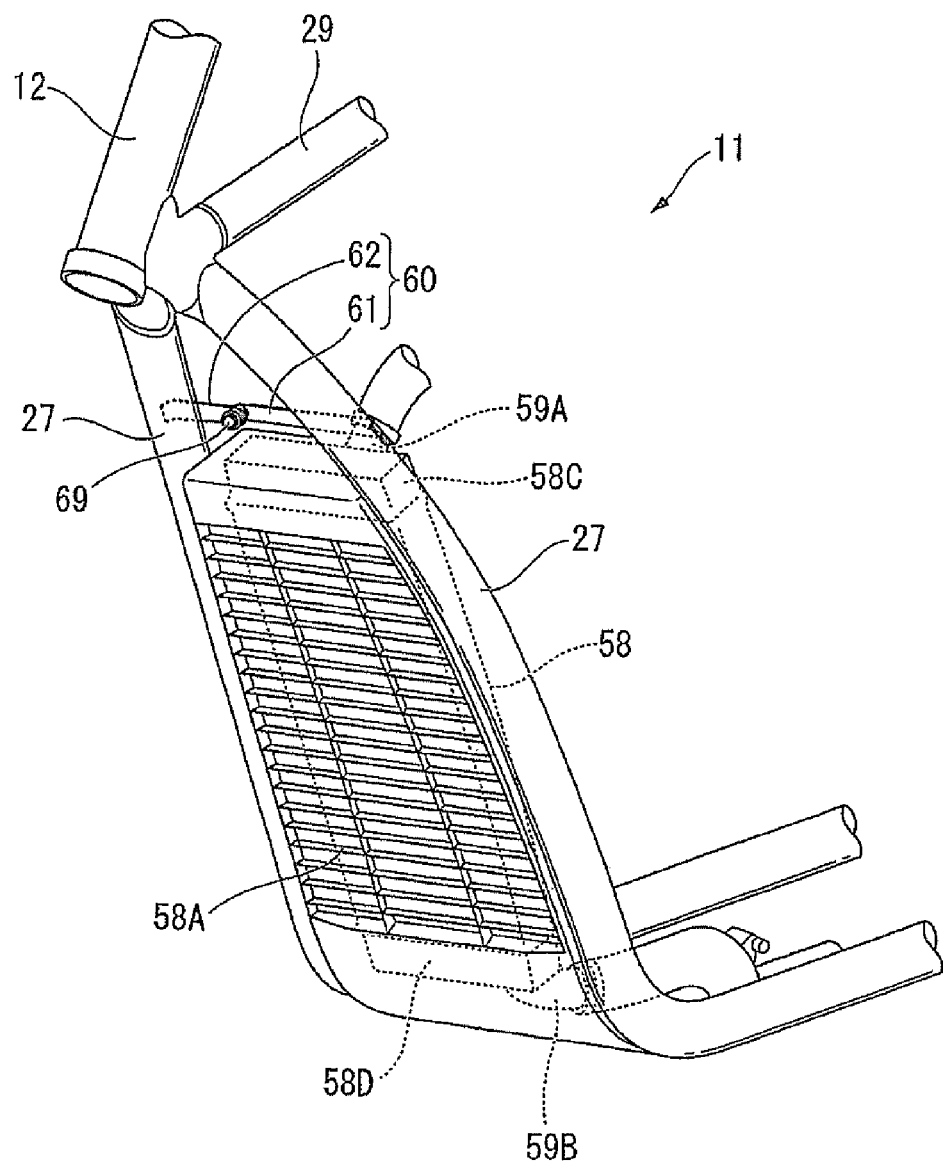
FIG. 3 is a perspective view showing the body frame of the motorcycle.
Figure 4:
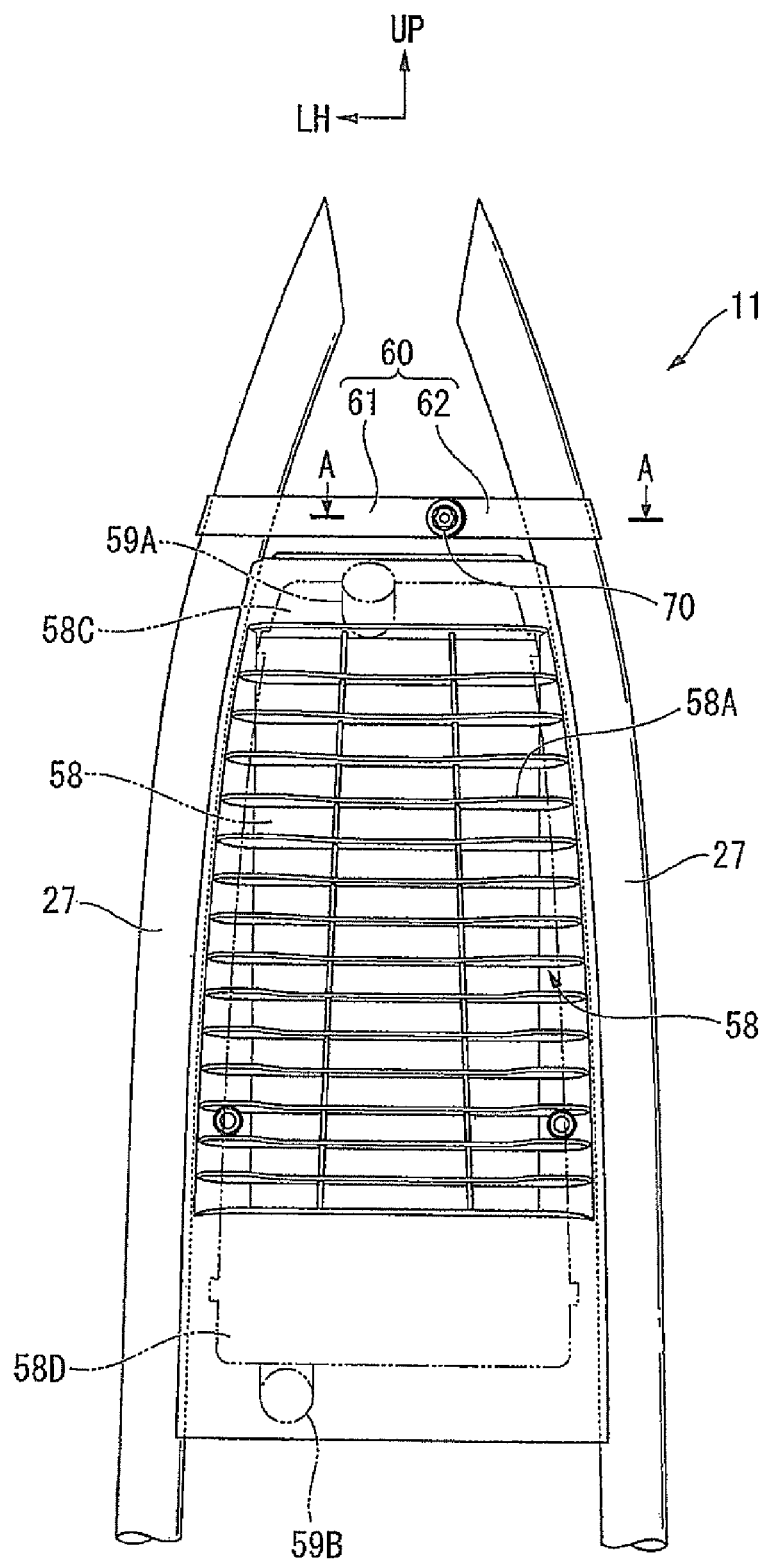
FIG. 4 is a rear view showing the body frame of the motorcycle.

FIG. 3 is the perspective view showing the body frame 11 from the left front. FIG. 4 is the rear view showing the down tube 27 of the body frame 11 as viewed from the rear.

Above a radiator 58, left and right down tubes 27, 27 are continuously connected by the cross plate 60 extending in the width direction of the vehicle. The cross plate 60 includes a left plate half (first cross plate) 61 made of metal plate material extending inward in the width direction of the vehicle, the base end of which is welded to the down tube 27 on the left side; and a right plate half (second cross plate) 62 made of metal plate material extending inward in the width direction of the vehicle, the base end of which is welded to the down tube 27 on the right side.

The radiator 58 and a radiator grille 58A covering at least the front surface of the radiator 58 is disposed between a pair of left and right down tubes 27, 27 in the front of the engine 17. The radiator 58 is formed in a vertically-long rectangular parallelepiped shape, and is constructed in a finned tube type radiator having a space through which traveling wind passes. An upper tank portion 58C having a pipe 59A is mounted on the upper portion of the radiator 58. A lower tank portion 58D having a pipe 59B is mounted on the lower portion of the radiator 58. The upper tank portion 58C and the lower tank portion 58D are formed in a trapezoidal shape with substantially same width as that of the radiator 58.

The radiator grille 58A, the front surface of which is disposed along the front surface of the down tubes 27, 27, is positioned so as to overlap the down tubes 27, 27 in a side view. Further, the head of the radiator grille 58A covers the front and upper sides of the upper tank portion 58C mounted on the upper portion of the radiator 58, and the bottom frame of radiator grille 58A cover the front and lower sides of the lower tank portion 58D, which is mounted on the lower portion of the radiator 58, and the pipe 59B thereof. Therefore, the radiator grille 58A functions as a face cover covering the upper tank portion 58C and the lower tank portion 58D so as not to be seen from the outside.

Figure 5:
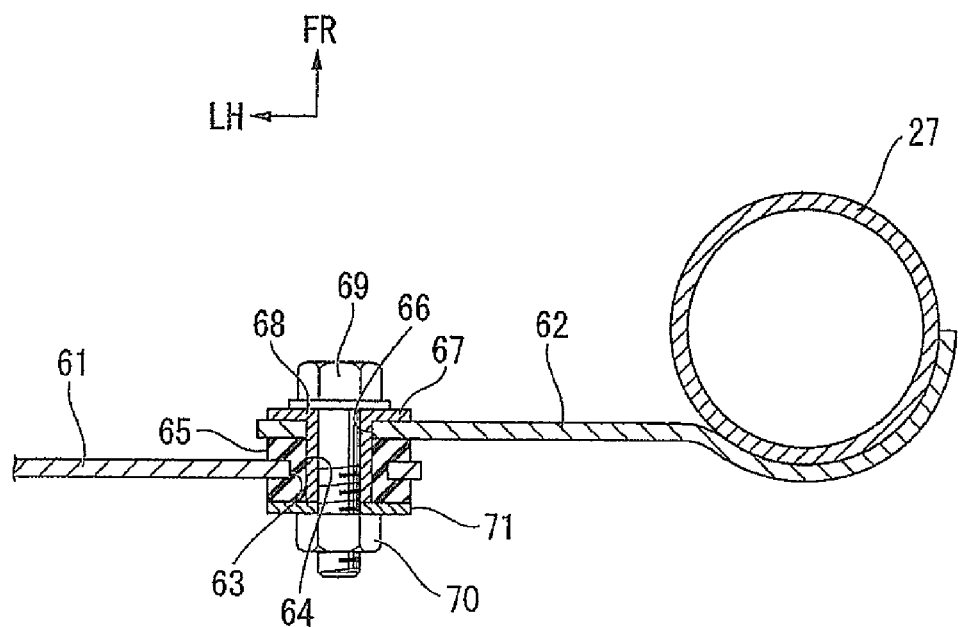
FIG. 5 is a cross-sectional view taken along a line A-A in FIG. 4.

FIG. 5 shows the cross-section taken along a line A-A of FIG. 4.

The left plate half 61 and the right plate half 62 extend parallel to each other with a space therebetween in the front-rear direction. The left plate half 61 is positioned in the rear of the right plate half 62. The left plate half 61 and the right plate half 62 are spanned between the down tubes 27, 27, such that the respective inside end portion thereof in the width direction of the vehicle are continuously connected (elastically connected) using the elastic member 65. The elastic member 65 made from resin is interposed in the respective inside end portion in the width direction of the vehicle of the left plate half 61 and the right plate half 62.

On an end portion of the left plate half 61, a fitting hole 63 is formed, into which the cylindrical elastic member 65 having the through hole 64 is fitted. The elastic member 65 which is fitted in the fitting hole 63 is supported on the left plate half 61 so as to have the through hole 64 (the axial direction thereof) aligned in the front-rear direction.

Figure 6:
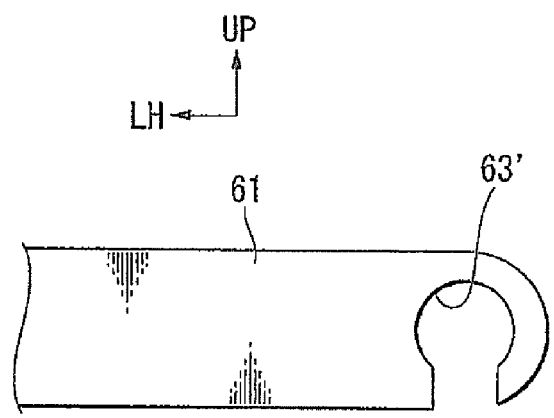
FIG. 6 is a view showing a modified example of the cross plate continuously connecting the frame sections.

Here, the fitting hole 63 in which the elastic member 65 is fitted may be configured perpendicular to the width direction of a vehicle as in the FIG. 6, and also be configured as a cutout 63' which is cut out in the direction along the surface direction of the plate.

On the end portion of the right plate half 62, a through hole 66 is formed, which overlaps the through hole 64 of the elastic member 65 such that the end portion of the right plate half 62 is aligned with the front surface of the elastic member 65. A metal collar 68 having a flange portion 67 abutted on the right plate half 62 is inserted into the through hole 66 of the right plate half 62, passes through the through hole 66 of the right plate half 62 as well as the through hole 64 of the elastic member 65, and has the end portion thereof aligned with the rear surface of the elastic member 65.

A bolt 69 is inserted in the collar 68 from the flange portion 67 side, that is, from the front side of the vehicle. The bolt 69 penetrates the elastic member 65, and the end portion thereof is engaged with a nut 70. The nut 70 fastens the elastic member 65 via a washer 71, which is fitted in the left plate half 61, so as to press against the right plate half 62.

As described above, the left plate half 61 and the right plate half 62 are continuously connected such that the cross plate 60 is spanned between the down tubes 27, 27. In the case where the down tubes 27, 27 are continuously connected with the cross plate 60 like this, each of the down tubes 27, 27 is allowed to produce as much distortion as that of the elastic member 65 when the distortion (particularly, the crosswise distortion) is produced in the down tubes 27, 27.

As described above, in the motorcycle 10 according to the embodiment of the present invention, the left and right down tubes 27, 27 are continuously connected by the cross plate 60, and the cross plate 60 is elastically connected to the down tubes 27, 27. Thus, the down tubes 27, 27 are allowed to moderately distort, which thereby suppresses the excessive distortion of the down tubes 27, 27 and improve the controllability and straight traveling characteristic of the vehicle by moderately increasing the steering effort.

Moreover, the left and right down tubes 27, 27 can be continuously connected just by elastically connecting the inside portions in the width direction of the vehicle of the left plate half 61 and the right plate half 62 each other, which extend inward in the width direction of the vehicle respectively from the down tubes 27, 27. Accordingly, the number of parts can be reduced.

Furthermore, in the embodiment of the present invention, a fitting hole 63 is formed on the left plate half 61. The elastic member 65 is fitted in the fitting hole 63. The elastic member 65 has the through hole 64, and the tubular collar 68 is inserted into the through hole 64. The cross plate 60 is elastically connected to the down tubes 27, 27 such that the left plate half 61 is fastened to the right plate half 62 via the fitting hole 63, the through hole 64 of the elastic member 65 and the bolt 69 penetrating the collar 68. According to such configuration, the elastic member 65 can be provided in the left plate half 61 in advance, which thereby can improve the assembly.

Next, referring to FIGS. 7 and 8, the modified examples of the above-described embodiment will be described. The same components as the above-described embodiment will be shown using the same reference numerals.

Figure 7:
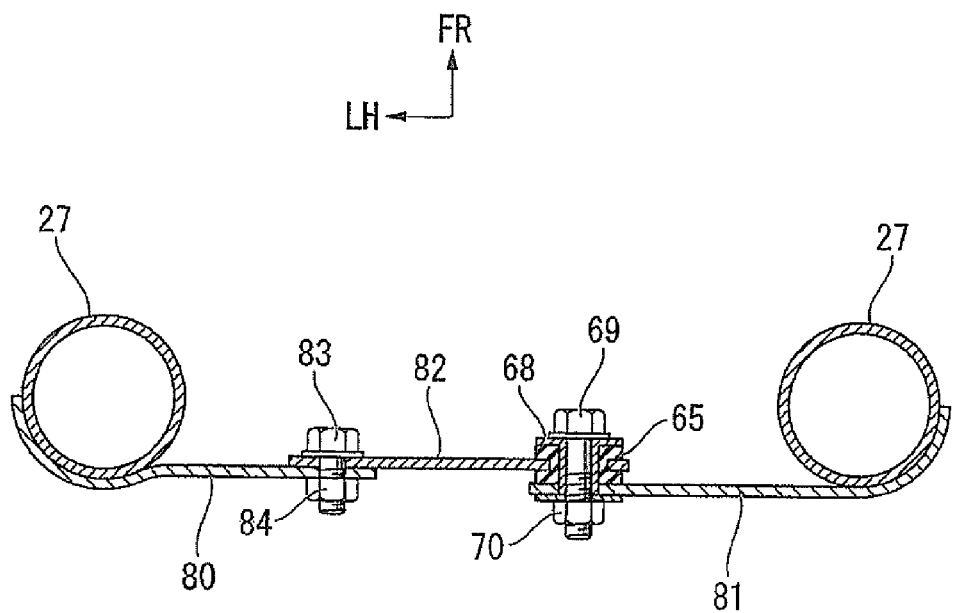
FIG. 7 is a view showing the modified example of the embodiment of the present invention.

In this modified example, as shown in FIG. 7, the left and right stays 80, 81 are welded to the left and right down tubes 27, 27. The end portions of the left stay 80 and the right stay 81 are spaced apart from each other in the width direction of the vehicle, between which the cross plate 82 extending in the width direction of the vehicle is spanned.

The left stay 80 and the left end portion of the cross plate 82 are fastened by a bolt 83 and a nut 84, and the right stay 81 and the right end portion of the cross plate 82 are elastically connected.

Figure 8:
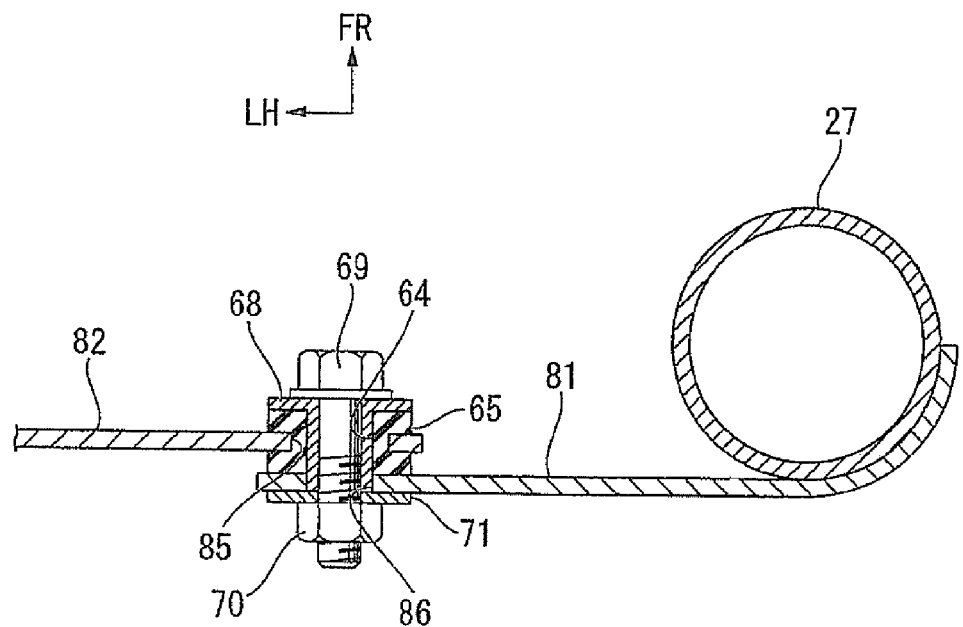
FIG. 8 is an exploded view of a portion of the modified example shown in FIG. 7.

As shown in FIG. 8, a fitting hole 85 similar to the fitting hole 63, discussed above, is formed on the right end portion side of the cross plate 82, and the elastic member 65 is fitted in the fitting hole 85. The collar 68 is inserted in the elastic member 65, and the bolt 69 is inserted into the collar 68. A through hole 86 is formed on the right stay 81, and the bolt 69 penetrates the through hole 86 and is fastened to the nut 70 abutting on the rear surface of the right stay 81.

Even in such modified example, it is possible to suppress the excessive distortion of the down tubes 27, 27 as well as to improve the controllability and straight traveling characteristic of the vehicle by moderately increasing the steering effort. Further, the elastic member 65 can be provided in the cross plate 82 in advance, which thereby can improve the assembly.

Having thus described the specific embodiment of the present invention, the present invention is not limited to the above-described preferred embodiment.

For example, in the above embodiment, the fitting hole 63, which is formed in the left plate half 61 of the cross plate 60, and the through hole 66, which is formed in the right plate half 62, are configured so as to have the axial direction thereof directed in the front-rear direction, and to fasten the bolt 69 from the front-rear direction. However, the fitting hole 63 and the through hole 66 may be vertically aligned, and be configured so as to fasten the bolt 69 from the top-bottom direction.

Additionally, while the configuration wherein the fitting hole 63 is formed so as to be partially open outward in the left plate half 61 of the cross plate 60 is described in the above-described embodiment, a hole penetrating the left plate half 61 may be formed instead. Moreover, the cross plate 60 or 82 which are positioned above the radiator 58 may be covered by the radiator grille 58A from the front. In such configuration, since the cross plate 60 or 82 is hidden by the radiator grille 58A, the appearance is further improved. Besides, since the elastic member 65 is also covered, it is possible to prevent the elastic member 65 from being exposed to rain and wind damage, which thereby maintains the elasticity thereof for longer.

Further, while the configuration wherein the cross plate is provided to the down tubes 27, 27 which have a large deflection in the body frame is described in the above-described embodiment, but not limited to this, the cross plate may be preferably used for the frame portion which has a relatively large distortion in a saddle-ride type vehicle. Such configuration can improve the controllability and straight traveling characteristic effectively, especially in case of the left and right down tubes 27, 27 which have a large distortion as in the above-described embodiment.

Furthermore, while the configuration wherein the cross plate 82 is elastically connected only to right stay 81 is described in the modified example of the above-described embodiment, the cross plate 82 may be elastically connected to the left stay 80 or may be elastically connected to both left and right stays 80, 81. In addition, while the configuration wherein the above-described embodiment of the present invention is adopted to a motorcycle as in an example, the present invention can be preferably used for saddle-ride type vehicles such as electric vehicles, fuel-cell vehicles and automatic three-wheeled vehicles.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A saddle-ride type vehicle, comprising
a head pipe;
a pair of left and right frame sections extending rearward from said head pipe;
a cross plate; and
a radiator having rectangular parallelepiped shape disposed between said pair of left and right frame sections:
wherein:
said cross plate continuously connects said pair of left and right frame sections in a width direction of the vehicle;
said cross plate provides an elastic connection between said frame sections;
said pair of left and right frame sections are provided integrally with a pair of left and right stays extending inward in the width direction of the vehicle respectively;
said cross plate is arranged between said pair of left and right stays;
at least one of said left and right stays is elastically connected to said cross plate; and
said cross plate is disposed above said radiator.

2. A saddle-ride type vehicle according to claim 1, further comprising
said cross plate having a hole formed therein;
an elastic member fitted in said hole, said elastic member having a through hole formed therein;
a tubular collar inserted into said through hole; and
a fastening member;
wherein said cross plate is elastically connected to said frame sections such that said cross plate is fastened to at least either one of said pair of left and right stays via said hole, said through hole of said elastic member and said fastening member penetrating said collar.

3. A saddle-ride type vehicle according to claim 2, wherein said frame sections include down tubes extending downward from said head pipe.

4. A saddle-ride type vehicle according to claim 2, wherein said hole is a cutout formed in a width-wise direction of said cross plate.

5. A saddle-ride type vehicle according to claim 1, wherein said frame sections include down tubes extending downward from said head pipe.

6. A saddle-ride type vehicle according to claim 1, wherein said cross plate is arranged frontward of said left and right stays.

7. A frame structure for a motorcycle, comprising
a head pipe;
a left down tube and a right down tube extending rearward from said head pipe;
a cross plate disposed at upper portion of said left and right down tubes for connecting said left and right down tubes to each other in a width direction of the vehicle; said cross plate comprising a first plate half and a second plate half connected to each at respective inside end portions thereof; and
a tubular collar,
wherein:
said first plate half and said second plate half are elastically connected to each other at respective inside end portions thereof via an elastic member interposed therebetween;
one of said first plate half and said second plate half has a fitting hole formed therein;
said elastic member is fitted in said hole; said elastic member having a through hole formed therein;
said tubular collar is inserted into said through hole; and
said one of said first plate half and said second plate half is fastened to other of said first plate half and said second plate half via said fitting hole, said through hole of said elastic member and a fastening member penetrating said tubular collar.

8. A frame structure according to claim 7, wherein one of said first plate half and said second plate is arranged at a rear of other of said first plate half and said second plate.

9. A frame structure according to claim 7, wherein an axis of said fitting hole is perpendicular to the width direction of the vehicle.

10. A frame structure according to claim 7, wherein said fitting hole is a cutout formed in a width-wise direction of said one of one of said first plate half and said second plate half.

* * * * *